350-389 SR

XR 3,602,904

[redacted]

TX4022C WP

[11] 3,602,904

[72] Inventor Stewart E. Cur
11810 Staffor
45344

[21] Appl. No. 804,872
[22] Filed Mar. 6, 1969
[45] Patented Aug. 31, 1971

[54] FERROELECTRIC GADOLINIUM MOLYBDATE BISTABLE LIGHT GATE-MEMORY CELL
6 Claims, 11 Drawing Figs.

[52] U.S. Cl. .......... 340/173.2, 350/150
[51] Int. Cl. .......... G02f 1/26, G11c 11/22, G11c 11/42
[50] Field of Search .......... 340/174.1 MO, 173, 173.2; 350/150; 353/25

[56] References Cited
UNITED STATES PATENTS

| | | | |
|---|---|---|---|
| 2,705,903 | 4/1955 | Marshall | 350/150 |
| 2,936,380 | 5/1960 | Anderson | 340/173 UX |
| | | | 340/174 |
| | | | 340/174 |
| | | | 350/150 |
| 3,239,671 | 3/1966 | Buhrer | 350/150 X |

OTHER REFERENCES

Cummins; Crystal Symmetry, Optical Properties, and Ferroelectric Polarization of $Bi_4$, $Ti_3$ $Q_{12}$ Single Crystals; 1/67; Applied Physics Letters; Vol. 10; No. 1; pp. 14–16

*Primary Examiner*—Terrell W. Fears
*Assistant Examiner*—Stuart Hecker
*Attorneys*—Harry A. Herbert, Jr. and Robert Kern Duncan

ABSTRACT: A ferroelectric gadolinium molybdate crystal $[Gd_2(MoO)_3]$, having transparent electrodes, positioned between crossed polarizers, is electrically switched between two stable states with extinction positions 45° apart providing a light gate-memory cell that is read out nondestructively, optically, either singularly or in combination to perform combined memory and logic functions.

INVENTOR.
STEWART E. CUMMINS

BY

Robert Ken Duncan

ATTORNEYS

INVENTOR.
STEWART E. CUMMINS

BY

Robert Kern Duncan
ATTORNEYS

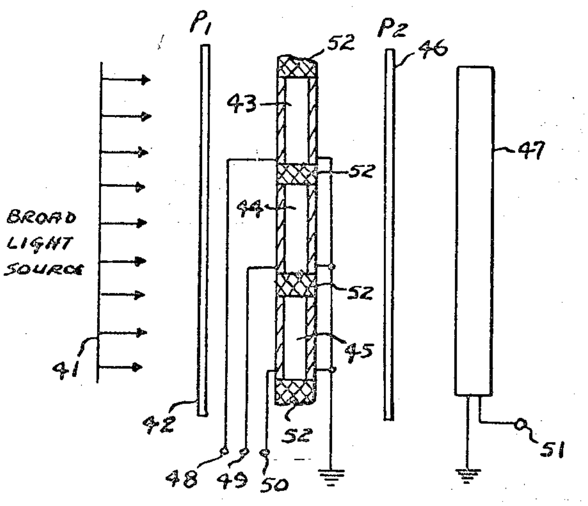
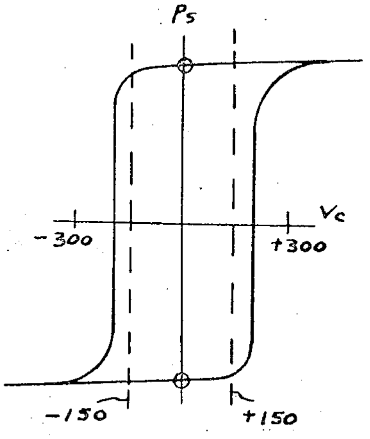
Fig-11
Fig-9
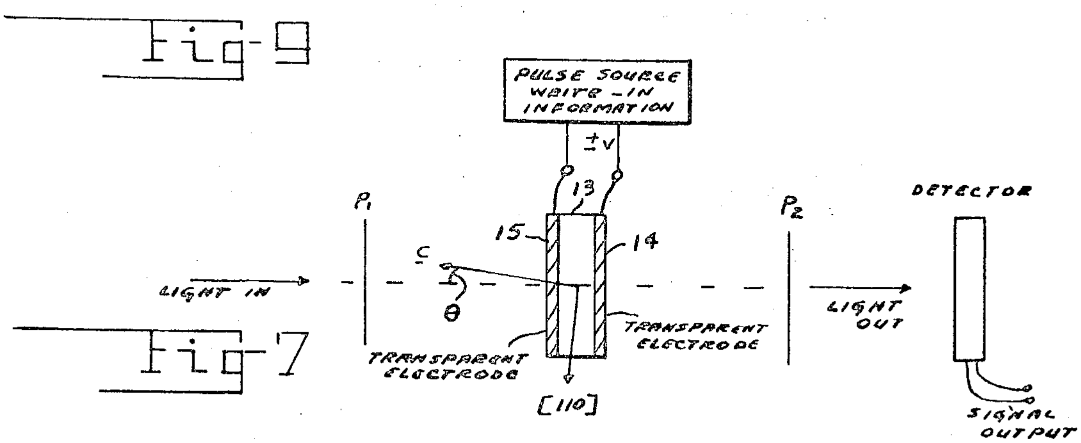
Fig-7
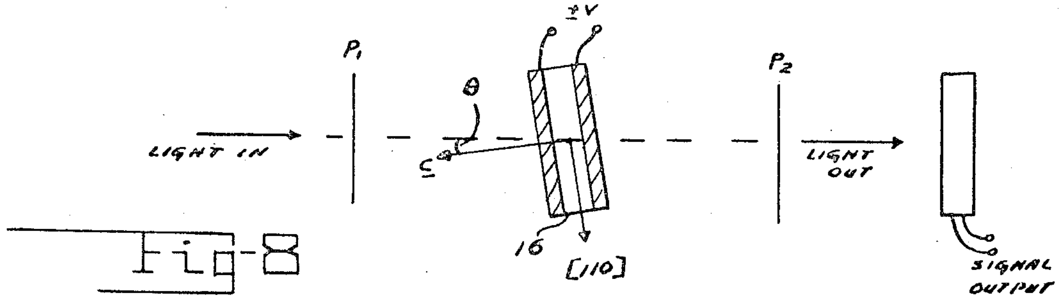
Fig-8
INVENTOR
STEWART E. CUMMINS
BY
Robert Kern Duncan
ATTORNEYS INVENTOR.
STEWART E. CUMMINS
BY
Robert Kern Duncan
ATTORNEYS

FERROELECTRIC GADOLINIUM MOLYBDATE BISTABLE LIGHT GATE-MEMORY CELL

BACKGROUND OF THE INVENTION

The invention relates to ferroelectric light gate and information storage devices.

The use of ferroelectric crystals for the storage of binary information is well known in the art. Most of the prior art devices have the disadvantage of having destructive readout. My earlier U.S. Pat. No. 3,374,473 discloses a bismuth titanate ($Bi_4Ti_3O_{12}$), optically read, ferroelectric crystal memory device. The device of my present invention produces a result similar to my formerly enumerated invention. The structure and operation of this invention is different in that the gadolinium molybdate device of this invention is an orthorhombic crystal having longitudinal electrical-optical characteristics with the switching field applied along the same axis as that of the controlled light beam while my prior device utilizes a monoclinic crystal having a transverse electrical-optical effect with the switching field applied at right angles to the controlled light beam.

In the prior bismuth titanate device the optimum area of entrance of light is through the narrow edge even though operation is possible with the light entering at 75° as illustrated on the drawing of that patent. To use a thicker bismuth titanate crystal so as to have a larger light entrance area necessitates the undesirable condition of increasing the potential creating the electric field. In the device disclosed herein using a gadolinium molybdate crystal the crystal may be made the thickness required for maximum light transmission in the ON state, and a thin crystal does not limit the area for light entrance. In addition, the area for light entrance is not limited by the electric field requirements.

A further advantage of this invention over the formerly enumerated invention is that large, easily worked crystals of high optical quality of $Gd_2MoO_4)_3$ are readily grown by well-known pulling techniques.

SUMMARY OF THE INVENTION

The invention is a ferroelectric light gate-memory cell having electrical write-in and nondestructive optical readout. It is based upon my discovery that gadolinium molybdate $[Gd_2(MoO_4)_3]$ has two stable ferroelectric polarization states between which the crystal can be switched by the momentary application of an electric field and in which the optical properties of the crystal are different enough to permit differentiation of the two states by simple optical means.

BRIEF DESCRIPTION OF THE DRAWING

FIG. 7 is a representative view of an embodiment of the invention in which the crystal is cut with the normal to the parallel crystal faces at an angle $\theta$ with the *c* axis;

FIG. 8 is a representative view of an embodiment of the invention having the crystal cut along its crystallographic axes with the light entering the crystal at an angle $\theta$ with the *c* axis;

FIG. 9 is a pictorial representation of three crystal elements positioned between crossed optical polarizers to provide a simple logic cell configuration;

FIG. 11 shows the hysteresis characteristics applicable to the coincident voltage selection embodiment of FIG. 10.

DESCRIPTION OF THE PREFERRED EMBODIMENTS

Borchardt and Bierstedt (see "Journal of Applied Physics," Vol. 38, No. 5, at page 2,057 (1967), and "Applied Physics Letters" Vol. 8, No. 2, at page 50 (1966)), have found the molybdates of the rare earths to be ferroelectric, and have defined values of spontaneous polarizations, coercive fields, and dielectric constants (relative permittivity). They also speculated that the line structures that they observed might be ferroelectric domains. I have found these crystals to be birefringent, determined the crystalline symmetry, determined the relationship between the spontaneous polarization ($P_S$) and the crystal axes, and the optical effects brought about by the changes in the indicatrix and crystal axes with changes in the direction and magnitude of the spontaneous polarization. The previously mentioned line structures I have found to be truly ferroelectric domain walls. The following detailed embodiment descriptions will be mainly concerned with the molybdate of the rare-earth gadolinium, however, those skilled in the art will readily apply these teachings to other ferroelectric rare-earth molybdates.

Crystals of gadolinium molybdate are orthorhombic, point group mm2. Crystal plates viewed down the *c* axis between crossed optical polarizers normally exhibit a number of ferroelectric domain walls. The extinction directions on opposite sides of a domain wall are quite sensitive to orientation but differ by less than 1° in a crystal carefully oriented for viewing down the *c* axis. The "slow" optic axes differ by approximately 90°. The birefringence in the view down the *c* axis is small (approximately $4\times10^{14}$ at 25° C.) but well defined. The interference figure and the birefringence values show *c* to be the acute bisectrix and the optic angle to be quite small. The positions of the orthorhombic *a* and *b* axes bear a fixed relationship with the sign of the ferroelectric polarization which is along the *c* axis. When the ferroelectric polarization (along *c*) is reversed 180° by an external voltage, the *a* and *b* axes essentially interchange giving a large change in the optical properties of the crystal.

Figure 1:
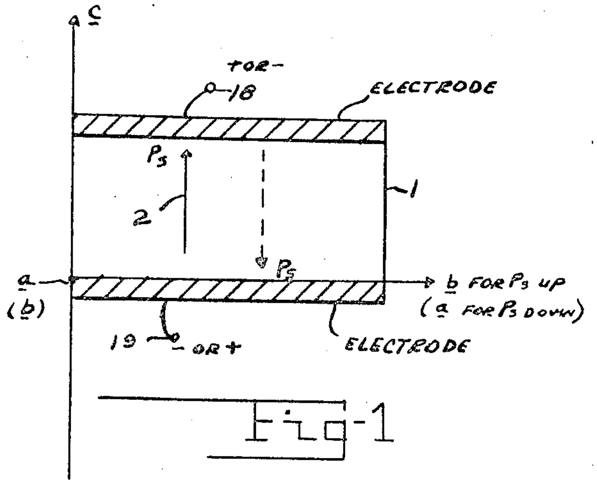
FIG. 1 shows how the axes change for a change in the electrical polarization of the crystal.
Figure 2:
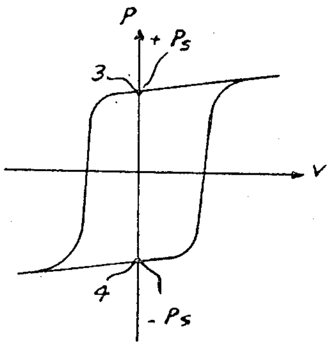
FIG. 2 shows the hysteresis characteristics of the crystal and the two stable states of spontaneous polarization.

FIG. 1 shows how the *a* and *b* axes of a crystal element 1 cut from a single crystal of gadolinium molybdate change with changes in the electrical polarization. When the direction of polarization 2 is up, the *b* axis is to the right and the *a* axis is in a direction out of the plane of the paper. Reversing the charge potential of terminals 18 and 19, reverses the direction of polarization $P_S$, and causes the *a* and *b* axes to interchange. The crystal is a bistable device in that it will remain in either state after the removal of the potential. Thus a momentary application of a voltage will switch the state of the crystal. FIG. 2 shows a typical hysteresis loop of the crystal with the two stable states of spontaneous polarization positions indicated at points 3 and 4 on the curve. (For $Gd_2(MoO_4)_3$ I have found the value for $P_S$ to be 0.20$\mu$C./cm.$^2$ at 25° C.)

Figure 3:
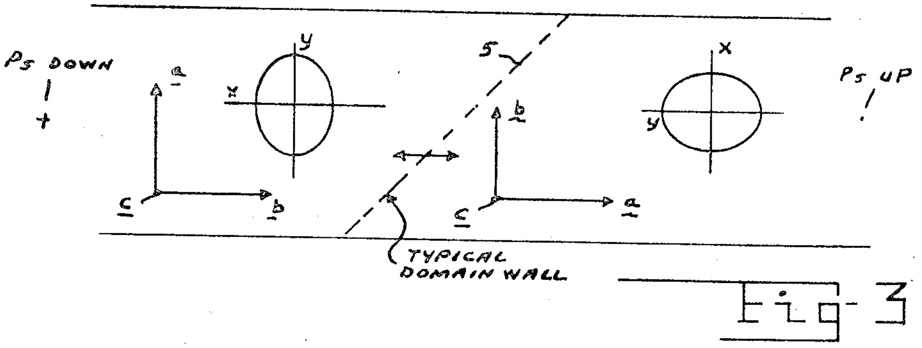
FIG. 3 is a representative view looking down the *c* axis of the crystal, depicting the crystal axes and optical indicatrix orientation for the two stable polarization states.
Figure 4:
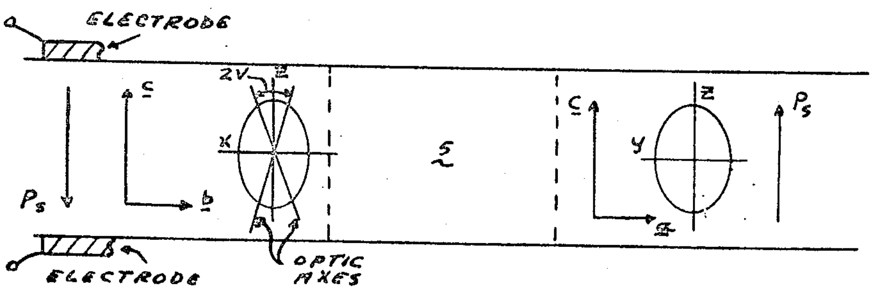
FIG. 4 is a front view of FIG. 3 showing the change in the crystal axes and optical indicatrix orientation with change in polarization.
Figure 5:
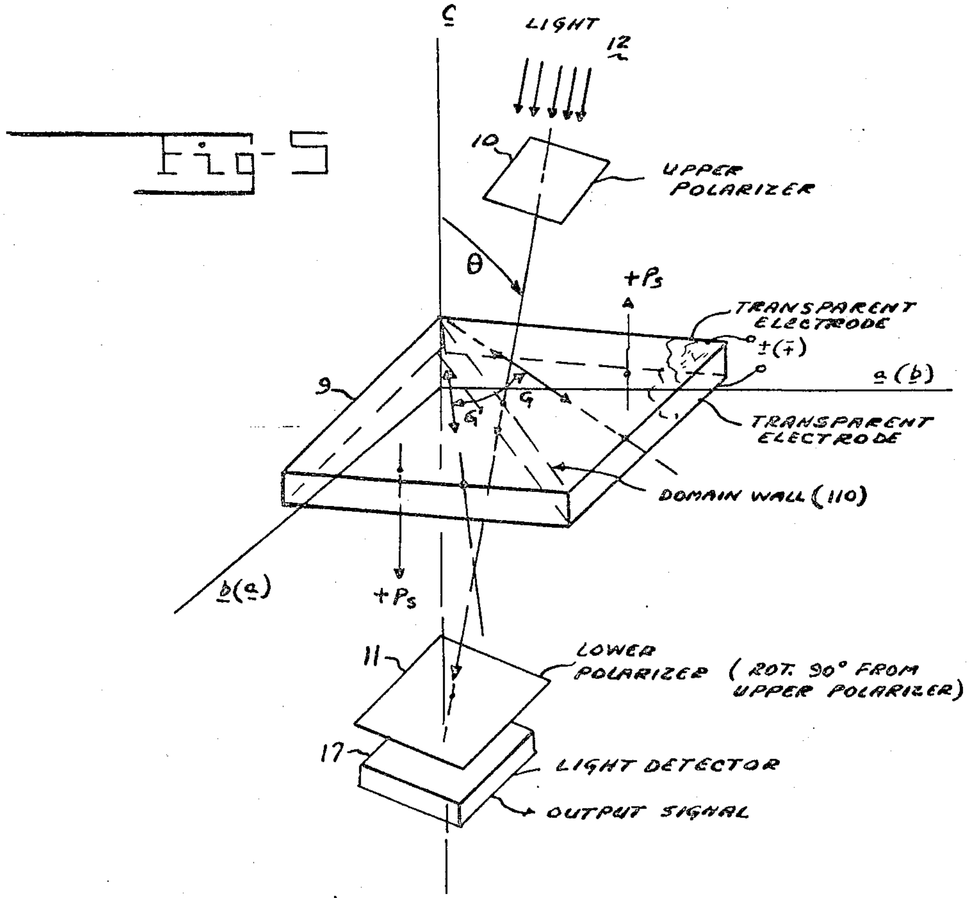
FIG. 5 is a representative view showing the effects of off-axis orientation of the crystal with respect to the light beam.

The domain walls in this crystal have been found to generally run parallel to the *c* axis and at 45° to the *a* and *b* axes. FIGS. 3 and 4 are to be considered together with FIG. 4 being a "front" view of FIG. 3. It is to be understood that the domain wall 5 and polarization states $P_S$ shown in these figures as well as the domain wall and polarization in FIG. 5, are shown in the transient or transition state for the purposes of understanding the operation of this invention. For simple on-off or binary applications, one polarization state exists throughout the crystal element and the domain wall effectively sweeps across the crystal element as polarization is changed, leaving the crystal in one stable state throughout. For analog applications partial switching of the crystal may be employed, in which case the polarization is changed only over a part of the crystal element and a domain wall (or walls) still exists in the element.

The reorientation of the *a* and *b* axes when the crystal element is switched also results in a reorientation of the optical indicatrix as shown in FIGS. 3 and 4. The indicatrix, a triaxial ellipsoid representing the refractive index in the crystal, is transposed approximately 90° around the *c* axis when the spontaneous polarization $P_s$ is reversed. The relative indicatrix orientation and directions of the axes are shown in the figures. The relative magnitudes of the refractive index in the X, Y, and Z directions of the indicatrix determine the position of the optic axes in the X–Z plane, i.e., the magnitude of the optic angle 2V. The optic axes in the gadolinium molybdate crystal lie very close (2V being less than 10°) to the Z axis (crystallographic *c* axis). This makes the optical properties of the crystal very sensitive to small tilts when the crystal is being viewed approximately down the *c* axis.

The domain wall 5 shown in FIGS. 3 and 4 of this material, as previously stated, runs generally parallel to *c* and at 45° to *a* and *b*. This is the plane with the general Miller indices (110). (Of course, the domain wall may be in either of the two equivalent planes 90° apart.) If a crystal plate is viewed exactly down the *c* axis (as looking down on FIG. 3), the extinction directions will coincide with X and Y of the indicatrix (and also with *a* and *b*). Thus I have found that the optical indicatrix position differs by approximately 90° in opposite polarity domains. The difference is not exactly 90° due to the fact that *a* and *b* are slightly different lengths. The actual difference from a 90° shift is less than 0.5°. Thus while the X and Y axes shift essentially 90° with changes in spontaneous polarization, the extinction directions differ only slightly when viewed between crossed optical polarizers and a crystal element being in extinction in one state of polarization, will still be essentially in extinction in the reversed state of electrical polarization. Thus while ferroelectric domains are observable in crossed polarized light the contrast in light passage is low when viewed exactly down the *c* axis.

Figure 6:
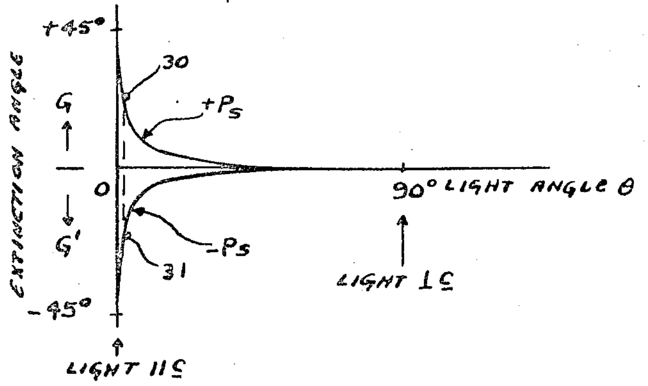
FIG. 6 is a plot of the relationships between the light angle $\theta$ and the extinction G—G' as shown in FIG. 5.

For this invention of providing a bistable light gate-memory device, it is desirable to have a large difference in the extinction directions in order to obtain large values of optical contrast. I have found that a large divergence of the extinction directions can be obtained by tilting the crystal slightly in the (110) plane. This is illustrated in FIGS. 5 and 6. In the FIG. 5, the crystal 9 is located between crossed polarizers 10 and 11 and the direction of the readout light 12 is at normal incidence to the crystal surface. The crystal is cut "off axis" by the angle $\theta$, from the crystal *c* axis; or stated differently, the crystal axis differs from the normal to the crystal plate by the angle $\theta$. This tilt of the crystal axes with respect to the crystal surfaces is a tilt in the (110) plane, i.e., in a plane parallel to the *c* axis and at 45° to the *a* and *b* axes. The effect of this tilt on the extinction directions for opposite polarity domains is shown in FIG. 6. It can be seen from this Figure that for light directed along, or parallel to, *c* the indicatrix is transposed approximately 90° (G being approximately 45° in one direction, G′ being approximately 45° in the other direction) for opposite ferroelectric polarization, and thus the extinction positions nearly coincide (to within 0.5) as previously stated. However, as the light path is changed by the angle $\theta$ from the *c* axis direction the extinction positions diverge rapidly. It has been found for example that for $\theta$ equal to approximately 6° the G and G′ angles indicated at 30 and 31 are each approximately 22½° giving a total angle of approximately 45° between extinction directions with a change in electrical polarization. Thus, only a small tilt (approximately 6°) is required in order to obtain an optimum difference in extinction directions (45°) that results in best optical contrast. A crystal then that is cut as shown in FIG. 5 and situated between crossed polarizers aligned on either G or G′ will provide an extinction (no light—or a minimum of light) to the detector 17 in one electrical polarization state and will provide a maximum of light transmission to the detector in the opposite polarization state. In practicing this invention as a bistable light gate-memory device the crossed polarizers are rotated to the extinction position for one domain (minimum light signal to the detector), then the other domain, occurring after the crystal is electrically switched, will be out of extinction and light will pass through the crystal and polarizers to the detector. It is to be understood that the detector 17 may be other than a simple light detector; for example, the light beam 12 can contain image information and the detector can be photographic film or another memory plane.

FIG. 7 shows symbolically a preferred embodiment of the invention. The crystal 13, with associated transparent electrodes 14 and 15, is cut "off axis" by the amount of angle $\theta$ (preferably 6°) and the light enters the crystal normal to its face. This crystal is cut as shown in FIG. 5. An alternative embodiment is shown in FIG. 8. In this embodiment the crystal 16 is cut along its crystal axis and the light is directed at an angle $\theta$ (somewhat larger than 6° because of refraction) from the normal to the crystal face. Generally this is not as efficient a device as that represented by FIG. 7.

Those skilled in the art will readily realize that the area of the crystal surface is not critical. It may be as small as a fraction of a square millimeter. Thus many crystal elements may be cut from a single crystal as grown, or the crystal element may be as large in cross-sectional area as feasible within the limits of the grown crystal. The use of cross polarizers, sometimes termed a polarizer and an analyzer, is well known, as is the structure and use of light beams and light detectors. These elements will not be further elaborated upon here. The conventional transparent electrodes previously mentioned may be sprayed-on or vapor-deposited tin oxide with a suitable dopant such as antimony or indium. The fabrication of suitable transparent electrodes on crystal surfaces is well known. The nominal coercive field of gadolinium molybdate crystals is approximately 5 kv./cm., and the relative permittivity, $\epsilon$, is low, being approximately 10. A crystal thickness equal approximately to one-half wavelength of green light will provide good light transmission in the visible spectrum. Thus the thickness of the crystal "*d*" may be calculated as follows:

The approximate wavelength $\lambda$ of green light expressed in millimicrons is, $$\lambda = 560 m\mu, \text{ giving,}$$
$$\lambda/2 = 280 m\mu;$$

the birefringence characteristic, $\Delta n$, of gadolinium molybdate crystals is approximately expressed by, $$\Delta n = 4 \times 10^{14};$$

the thickness of the crystal is thus, $$d = (\lambda/2)/\,\Delta n, \text{ or approximately } 0.07 \text{ cm.}$$

Since the foregoing value of "*d*" is calculated along the *c* axis, a slightly thinner crystal may be used as the retardation through the crystal is slightly greater due to the 6° off-axis cut. For simple light-gate application of this invention (i.e. when partial switching is not desired), and considering the coercive field of 5 kv./cm. and with a crystal 0.07 cm. thick, switching pulses at the electrical terminals contacting the transparent electrodes, of approximately 500 volts, have been found to be very satisfactory to completely switch the spontaneous polarization of the crystal. It is to be understood that thinner crystals could be used, having a lower switching voltage requirement, at some sacrifice in the general amount of light transmitted over the visible spectrum in the ON state. It is also to be observed that the crystal thickness may readily be made compatible with any particular frequency of light radiation, for instance when the invention is used as a light gate for a particular wavelength of laser beam.

To still further aid those practicing this invention, the spontaneous polarization, $P_S$, of gadolinium molybdate is, in microcoulombs per square centimeter, approximately expressed by:

$$P_S = 0.20 \mu C./cm.^2,$$

and for a typical crystal element having a cross-sectional area of 0.0005 square centimeters, the charge $Q_T$ required to go from one saturated state to the other is, $$Q_T = 2P_S \times A, \text{ or approximately } 2 \times 10^{14} \mu C.$$

Generally, it has been found not to be desirable to combine multiple switching elements in high density memory applications in one crystal piece due to the interaction of one area with adjacent crystal areas.

A simple memory logic array of a plurality of elements is shown in FIG. 9. Light from the broad light source 41 passes through the first optical polarizer 42, the individual bistable crystal elements 43, 44, and 45, the second optical polarizer 46 (rotated 90° to the first polarizer), and on to the light-sensing detector 47. The positive and negative pulses for establishing the spontaneous polarization in each respective crystal element are connected to terminals 48, 49, and 50. The readout signal from the detector is taken from terminal 51. The individual crystal elements are all cut at the 6° off-axis angle as previously described. This device may be used as an OR gate as follows. An output at terminal 51 is taken as a "1"; and a signal at terminals 48, 49, and 50 that polarizes each respective element so that light conduction through the channel containing that element occurs is taken as a "1," then when 48 = "1," or 49 = "1," or 50 = "1," then 51 = "1." For AND gate applications, no output at terminal 51 is taken as a "1" and a voltage pulse at terminals 48, 49, and 50 that polarizes each respective crystal element so that no light conduction in that channel takes place is termed as a "1," then when 48 = "1," and 49 = "1," and 50 = "1," a "1" out will be present at terminal 51. Since each crystal element possesses memory it is not required in either of these gating applications that input pulse information occur simultaneously or in any order. It is merely required that the pulse establishing the spontaneous polarization to have been present at the terminal. It is to be understood that light blockage material 52 must be used between the elements and at their edges to prevent uncontrolled light from reaching the detector. This material may be any common insulating material. It may also be the support for the crystal elements.

Figure 10:
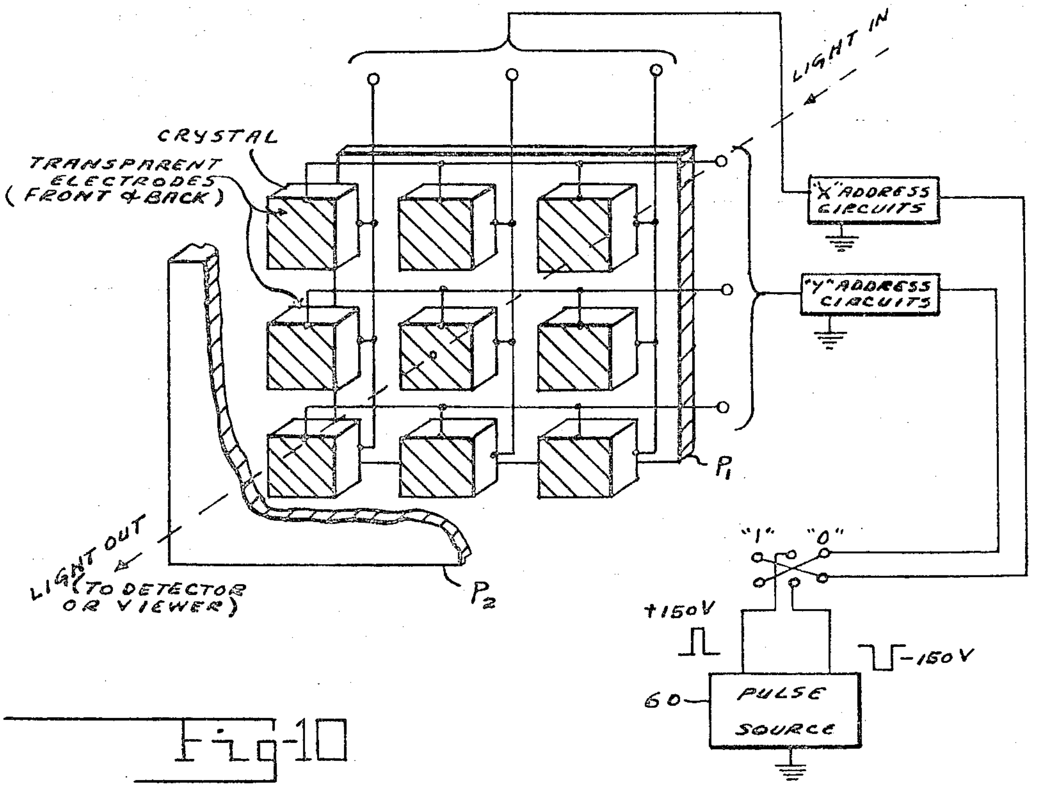
FIG. 10 is a pictorial representation of an optical display array with memory.

FIG. 10 is a view of a representative coincident voltage-selected array using the gadolinium molybdate crystal elements to provide an optical display with memory. Display arrays of similar nature to perform this function are well known. Prior arrays have not had the advantages brought about by using gadolinium molybdate crystals as taught herein. In this array the individual elements are cut 6° off-axis, as previously explained, and the use of crossed polarizers and transparent electrodes has been described. In a particular embodiment the crystal thickness "*d*" was cut to 0.4 mm. As previously stated $Gd_2(MoO_4)_3$ has a coercive field of 5,000 volts per centimeter. Thus the coercive voltage for the crystals in this array is approximately 200 volts. The pulse source 60 produces simultaneously both positive and negative 150-volt pulses. By observing the hysteresis characteristic of FIG. 11 it may be seen that simultaneous application of both positive and negative pulses (300 volts) will switch the spontaneous polarization of the crystal, but that an application of a single 150-volt pulse will not change the spontaneous polarization. In this array then independent control of each crystal element is provided, and any configuration of display pattern may readily be obtained. It is to be noted that if a light display is desired on a dark background light blockage material must be used, as previously explained between the crystal elements. Shades of grey may also be obtained by the partial switching of a crystal by limiting the current flow (and thus the fraction of $P_S$ switched) during a pulse, in which case only part of the crystal changes polarization. A light diffuser may then be employed to spread the light over a given area.

While the embodiments described in detail herein have all specifically utilized a gadolinium molybdate crystal, it is well known that molybdates of the class of elements known as rare earths are ferroelectric in characters. Thus other rare-earth elements may in general be substituted for the gadolinium in the crystals utilized in practicing this invention. For example, $Tb_2(MoO_4)_3$, $Eu_2(MoO_4)_3$, and $Sm_2(MoO_4)_3$ all have values of spontaneous polarization relatively close to that of $Gd_2(MoO_4)_3$. The strengths of their coercive fields are, however, somewhat higher than that of $Gd_2(MoO_4)_3$.

I claim:

1. A bistable memory cell with electrical write-in and nondestructive optical readout comprising:
 a. a single crystal of the ferroelectric material gadolinium molybdate;
 b. first and second light polarizers having polarization directions at right angles;
 c. means for passing light through the first polarizer, the crystal, and the second polarizer in succession in a direction at an angle of approximately 6° to the crystallographic *c* axis in a plane parallel to the *c* axis and said plane being approximately 45° to the *a* and *b* axes;
 d. transparent electrodes on the said crystal for applying an electric field essentially along the *c* axis of the crystal;
 e. means coupled to the said electrodes for selectively applying an electric pulse of either polarity therebetween for inserting information into the memory device;
 f. the said crystal being oriented in a position relative to the directions of the said light polarizers for extinction when the electrical polarization is that corresponding to an applied electric pulse of a predetermined polarity; and
 g. means for sensing the light that has passed through the second polarizer.

2. An electrically controlled optical light gate-memory device comprising:
 a. a single ferroelectric crystal of a molybdate of a rare earth having two stable electrically, controlled states of spontaneous polarization and different optic axes positions for each state of spontaneous polarization;
 b. first and second light polarizers having polarization directions at right angles;
 c. means for passing light through the first polarizer, the crystal, and the second polarizer in succession;
 d. electrical means including transparent electrodes cooperating with the said crystal, for controlling the said state of the spontaneous polarization of the crystal;
 e. light-detecting means for sensing the light that has passed through the second polarizer; and
 f. the said crystal being oriented with respect to the said optic axes and the said light polarizers to provide a lower value of light to said light detector in one of the said stable states of polarization than in the other said stable state of polarization.

3. A bistable memory cell and light gate having electrical write-in and nondestructive optical readout comprising:
 a. a crystal element cut from a single crystal of gadolinium molybdate, the element having two parallel crystal faces cut normal to a line making an angle of approximately 6° with the crystallographic *c* axis, said line lying in a plane containing the *c* axis and said plane being at approximately 45° to the crystallographic *a* and *b* axes;
 b. first and second light polarizers having polarization directions at right angles;
 c. means for passing light through the first polarizer, the crystal element, and the second polarizer in succession in a direction normal to the faces of the said crystal element for reading out the device;
 d. transparent electrodes on the said parallel faces of the crystal element for applying an electric field to the crystal element;
 e. means coupled to the said electrodes for selectively applying an electric pulse of either polarity therebetween for providing a uniform spontaneous polarization to the crystal element responsive to the polarity of the electric pulse for inserting information into the memory device;
 f. the said crystal element being oriented in a position relative to the directions of the said light polarizers for extinction when the spontaneous polarization of the crystal element is that corresponding to an applied electric pulse of a predetermined polarity; and
 g. detecting means for sensing the light that has passed through the second polarizer.

4. The bistable memory cell and light gate as claimed in claim 3 wherein the thickness of the crystal element between the parallel cut crystal faces is determined by dividing a half wavelength of the reading-out light by the birefringence characteristic of the crystal material.

5. A bistable memory cell and light gate having electrical write-in and nondestructive optical readout comprising:

a. a crystal element cut from a single crystal of gadolinium molybdate, the element being cut along the crystal axes and having parallel faces normal to the crystallographic *c* axis;

b. first and second light polarizers having polarization directions at right angles;

c. means for passing light through the first polarizer, the crystal element, and the second polarizer in succession in a direction making an angle of at least 6° with the crystallographic *c* axis of the crystal element;

d. transparent electrodes on the said parallel faces of the crystal element for applying an electric field to the crystal element;

e. means coupled to the said electrodes for selectively applying an electric pulse of either polarity therebetween for providing a uniform spontaneous polarization to the crystal element responsive to the polarity of the electric pulse for inserting information into the memory device;

f. the said crystal element being oriented in a position relative to the directions of the said light polarizers for extinction when the spontaneous polarization of the crystal element is that corresponding to an applied electric pulse of a predetermined polarity; and g. detecting means for sensing the light that has passed through the second polarizer.

6. A logic array with electrical write-in and nondestructive optical readout providing a gate function with memory comprising:

a. a plurality of equivalent single crystal elements cut from a crystal of the ferroelectric material gadolinium molybdate, each crystal element having two parallel crystal faces cut normal to a line making an angle of approximately 6° with the crystallographic *c* axis, said line lying in a plane containing the *c* axis and said plane being approximately 45° to the crystallographic *a* and *b* axes;

b. positioning means for placing the plurality of crystal elements with their corresponding parallel faces in plane relationships, c. first and second light polarizers having polarization directions at right angles;

d. means for passing light through the first polarizer, the plurality of crystal elements in plane relationship, and the second polarizer in succession in a direction normal to the faces of the said plurality of crystal elements for reading out the array;

e. transparent electrodes on the said parallel faces of each of the said plurality of crystal elements for applying an electric field to each crystal element;

f. means coupled to the said electrodes for selectively applying an electric pulse of either polarity therebetween independently to each crystal element for providing a uniform spontaneous polarization to each crystal element responsive to the polarity of the respective electric pulse for inserting information into each crystal of the logic array;

g. each of the said crystal elements being oriented in a position relative to the directions of the said light polarizers for extinction when the spontaneous polarization of the crystal element is that corresponding to an applied electric pulse of a predetermined polarity; and h. detecting means for sensing the light that passes through the second polarizer.